United States Patent [19]

Staib

[11] Patent Number: 5,580,226

[45] Date of Patent: Dec. 3, 1996

[54] SPRING-LOADED NONRETURN VALVE

[75] Inventor: Helmut Staib, Schwieberdingen, Germany

[73] Assignee: Robert Bosch GmbH, Stuttgart, Germany

[21] Appl. No.: 597,823

[22] Filed: Feb. 7, 1996

[30] Foreign Application Priority Data

Feb. 7, 1995 [DE] Germany ............... 195 03 945.9

[51] Int. Cl.⁶ ............... F16K 15/02; F04B 53/10
[52] U.S. Cl. ............... 417/549; 137/535
[58] Field of Search ............... 137/535; 251/337; 417/549, 552

[56] References Cited

U.S. PATENT DOCUMENTS

| | | | |
|---|---|---|---|
| 860,283 | 7/1907 | Daniel | 417/549 |
| 1,448,263 | 3/1923 | De Rigne | 417/549 |
| 2,775,944 | 1/1957 | Ryder et al. | 417/549 X |
| 3,895,647 | 7/1975 | Willenbrock et al. | 137/535 X |
| 5,009,581 | 4/1991 | Kushiyama et al. | |

*Primary Examiner*—Richard E. Gluck
*Attorney, Agent, or Firm*—Edwin E. Greigg; Ronald E. Greigg

[57] ABSTRACT

The invention relates to a spring-loaded nonreturn valve. For ease of production and assembly, a spring element is designed as a leaf spring which is bent in a zigzag shape and is arranged in a transverse groove of a valve closure body. For connection to a spring holder, the leaf spring has a loop with which it is snapped in on a section of the spring holder bent out of wire. The spring holder has a spring ring which is integral with it and is inserted in a groove in a blind bore of a delivery piston, forming a valve housing, of a reciprocating pump.

23 Claims, 2 Drawing Sheets

SPRING-LOADED NONRETURN VALVE

PRIOR ART

The invention relates to a spring-loaded nonreturn valve which is provided as an inlet valve in a delivery piston of a reciprocating pump.

A nonreturn valve of this type is known from U.S. Pat. No. 5,009,581, in which a ball, as a valve closure body, is pressed by a helical compression spring as a spring element against a valve seat. Disadvantageous in the known nonreturn valve is the complex assembly of the valve closure body and of the spring element.

ADVANTAGES OF THE INVENTION

In the nonreturn valve according to the invention the valve closure body is connected to a spring holder by means of undercuts which engage behind stop faces of said spring holder. This results in a compact module which comprises the valve closure body, the spring element and the spring holder, is easy to handle and can be mounted in the valve housing in a simple manner. The correct installation position of the valve closure body, the spring element and the spring holder in the valve housing can easily be checked by a visual inspection. Furthermore, the nonreturn valve according to the invention allows large flow cross sections and requires only a small installation space, thus allowing it to be accommodated in a delivery piston without difficulty.

The disclosure relates to advantageous embodiments and further developments of the invention specified hereinafter.

BRIEF DESCRIPTION OF THE DRAWINGS

The invention is explained in greater detail below with reference to a drawing in which embodiments of the invention are illustrated. In the drawings.

DETAILED DESCRIPTION OF THE FIRST EXEMPLARY EMBODIMENT

Figure 1:
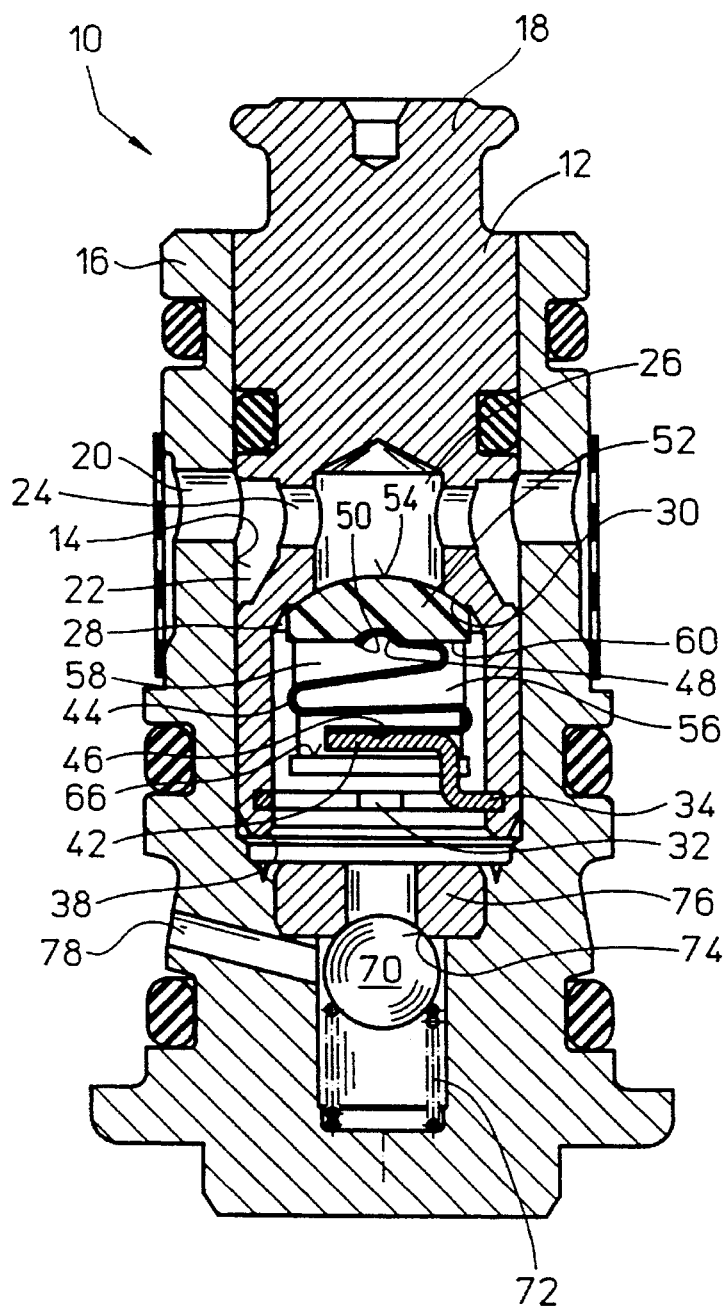
FIG. 1 shows a longitudinal section through a nonreturn valve according to the invention as an inlet valve in the delivery piston of a reciprocating pump.

FIG. 1 illustrates a reciprocating pump which is denoted in its entirety by 10 and is provided for installation in a hydraulic block. The reciprocating pump 10 has a delivery piston 12 which is held in a cylinder bore 14 of a cylinder 16 such that it can be driven to carry out a reciprocating stroke movement. To drive the piston, the delivery piston 12 has a head 18 which protrudes out of the cylinder 16. The drive itself is not illustrated.

The cylinder 16 is provided with an inlet bore 20 running transversely through the cylinder bore 14. The inlet bore 20 communicates via a circumferential groove 22 in the outer circumference of the delivery piston 12 and through a transverse bore 24, made in the groove base, in the delivery piston 12 with a blind bore 26 made axially in the delivery piston 12. The groove 22 has such a width that the inlet bore 20 in the cylinder 16 communicates with the blind bore 26 in any position of the delivery piston 12.

The delivery piston 12 is designed as a valve housing of a nonreturn valve according to the invention. The blind bore 26 in the delivery piston 12 is stepped and it tapers from its opening side with an annular shoulder 28 on which a conical valve seat surface 30 is configured.

Figure 3:
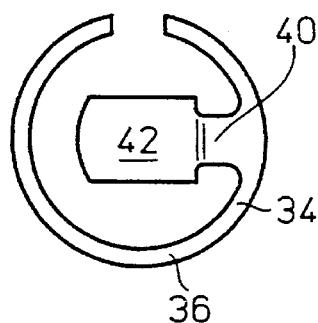
FIG. 3 shows a plan view of a spring holder according to FIGS. 1 and 2.

Near to its mouth, a circumferential groove 32 is recessed into the delivery piston 12 in the blind bore 26, in which groove a spring holder 34 is inserted. The spring holder 34, illustrated in plan view in FIG. 3, is a punched and bent sheet-metal component. At one point on its circumference it has an open spring ring 36. When the latter is inserted in the delivery piston 12, it is compressed elastically in the radial direction at a chamfer 38, located at the mouth of the blind bore 26, and rebounds again when it snaps into the groove 32 in the blind bore 26, as a result of which the spring holder 34 is fastened in the delivery piston 12.

A holding web 40, projecting radially inward and reaching beyond the center, is integral with the spring ring 36. Toward the interior of the blind bore 26, it is bent twice at right angles in the manner of steps so that a central region 42 of the holding web 40 is arranged in the delivery piston 12 parallel to a plane spanned by the spring ring 36 and offset relative to said plane toward the interior of the blind bore 26.

A leaf spring 44, which is bent three times in a zigzag shape, is welded by spot welding 46 on the central region 42. Instead of the weld, the leaf spring 44 could also be connected to the central region 42 of the spring holder 34, for example, by bonding, riveting, screwing or by a strap connection.

The leaf spring 44 engages with an arcuate free end 48 in a concavely curved recess 50 on a valve closure body 52 and presses its sealing surface 54 against the valve seat surface 30 of the delivery piston 12. The arcuate end 48 of the leaf spring 44 and the recess 50 in the valve closure body 52 are located on a mid-axis of the delivery piston 12, in whose direction a line of application of spring force also runs, so that the leaf spring 44 engages centrally on the valve closure body 52 and does not cause a tilting moment.

Figure 2:
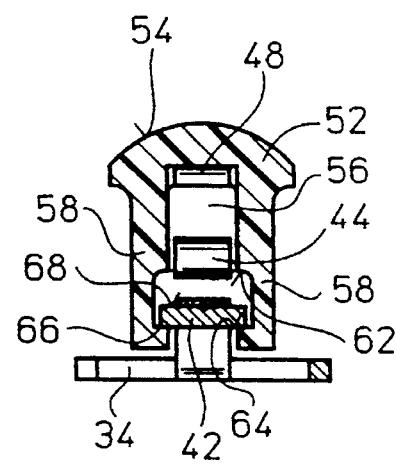
FIG. 2 shows an axial section, turned through 90° compared to FIG. 1, through a valve closure body module of the nonreturn valve from FIG. 1.

The valve closure body 52, which is illustrated in FIG. 2 turned through 90° compared to FIG. 1, is a rotationally symmetrical injection molded component made of plastic. Its valve closure surface 54 pointing into the interior of the blind bore 26 is designed in the shape of a spherical cap. In the direction of the mouth of the blind bore 26, the valve closure body 52 continues into a cylindrical part which is divided into two limbs 58 by a transverse groove 56 which is open at an end face of the valve closure body 52 facing the sealing surface 54. Located in the transverse groove 56 are the leaf spring 44 and the central region 42 of the holding web 40 of the spring holder 34.

The curved recess 50 of the valve closure body 52 for receiving the arcuate end 48 of the leaf spring 44 is located at the base 60 of the transverse groove 56. The spacing of the recess 50 from the sealing surface 54 of the valve closure body 52 is smaller than the radius of the sealing surface 54, as a result of which the leaf spring 44 exerts a moment on the valve closure body 52, which moment aligns the valve closure body 52 in the axial direction.

Toward its open end, the transverse groove 56 of the valve closure body 52 widens, forming stroke limiting surfaces 62, and tapers again with spacing from the stroke limiting surfaces 62, forming undercuts 64. The stroke limiting surfaces 62 and the undercuts 64 interact with the central region 42 of the spring holder 34 in the following manner: said central region 42 is wider than the holding web 40 connecting it integrally to the spring ring 36 of the spring holder 34. The central region 42 thus projects laterally over the holding web 40 and, in this way, forms lateral lower and upper stop faces 66, 68. The undercuts 64 of the valve closure body 52 engage behind the lower stop faces 66 and thus hold the valve closure body 52 on the spring holder 34 as long as it has not yet been inserted in the blind bore 26 of the delivery piston 12. In this case, the leaf spring 44 is under pretension. When the spring holder 34 has been inserted in the groove 32, the lower stop faces 66 of the spring holder 34 are lifted off from the undercuts 64 of the valve closure body 52 (FIG. 1), and the leaf spring 44 is pretensioned to a slightly greater extent. The full opening stroke of the valve closure body 52 is limited by its stroke limiting surfaces 62 which strike against the upper stop faces 68 of the spring holder 34 when the nonreturn valve according to the invention is fully opened.

In order to connect the valve closure body 52 to the spring holder 34, the latter is pushed from the side, together with the leaf spring 44, into the transverse groove 56 of the valve closure body 52, the leaf spring 44 being compressed and its free arcuate end 48 being brought into the curved recess 50 of the valve closure body 52. The valve closure body 52, the leaf spring 44 and the spring holder 34 form a module which is easy to handle when being inserted in the delivery piston 12 forming the valve housing.

As outlet valve, the reciprocating pump 10 has a spring-loaded ball valve: a ball 70 as valve closure body is pressed by a helical compression spring 72 against a valve seat 74. The valve seat 74 is located on an annular body 76 which is fastened by bracing in an extension of the cylinder bore 14 and holds the ball 70 and the helical compression spring 72 in their positions. A radial outlet bore 78 in the cylinder 16 serves as outlet.

Description of the Second Exemplary Embodiment

Figure 4:
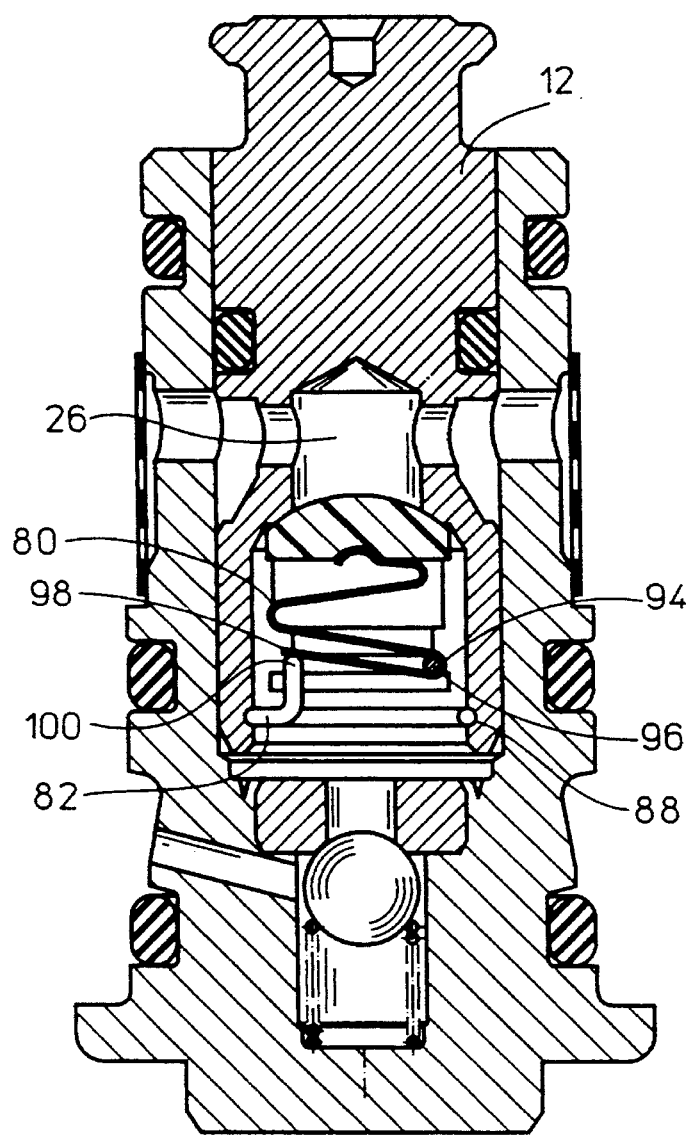
FIG. 4 shows a longitudinal section through a second embodiment of the invention.
Figure 5:
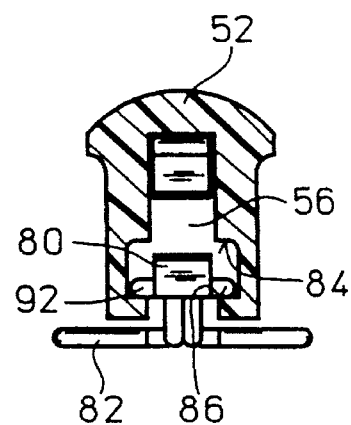
FIG. 5 shows an axial section, turned through 90° compared to FIG. 4, through a valve closure body module of the nonreturn valve shown in FIG. 4.
Figure 6:
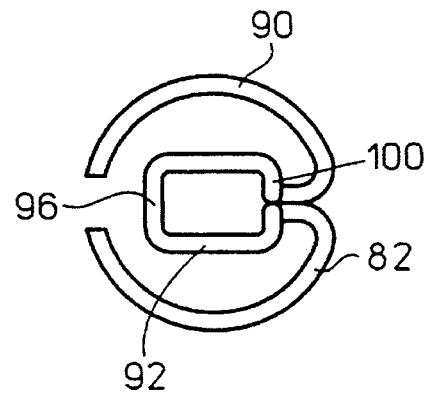
FIG. 6 shows a spring holder of the embodiment shown in FIGS. 4 and 5 of a nonreturn valve according to the invention.

FIGS. 4 to 6 show a second embodiment of a nonreturn valve according to the invention, the sections and views of FIGS. 4 to 6 corresponding to those of FIGS. 1 to 3. Compared to the first exemplary embodiment of the invention, a leaf spring 80 and a spring holder 82 have been modified, stroke limiting surfaces 84 and undercuts 86 of the valve closure body 52 have been adapted to the modified spring holder 82. Furthermore, a groove 86 in the blind bore 26 of the delivery piston 12 is semicircular in cross section, whereas the cross section of the corresponding groove 32 in the delivery piston 12 of the first embodiment of the invention is rectangular. Otherwise, the nonreturn valve according to the invention in accordance with the second embodiment of the invention is of identical construction to that of the first embodiment, reference is thus made to the description of the first exemplary embodiment.

The spring holder 82 of the second embodiment of the invention is a bent wire component. Its spring ring 90 comprises two circular arc-shaped wire sections, each of which is slightly shorter than a semicircle, so that the spring ring 90 is open at one point of its circumference (FIG. 6). Opposite the open point, the wire of the spring holder 82 is bent radially inward and subsequently at right angles into the interior of the blind bore 26. Subsequently, the wire of the spring holder 82 is bent to form a rectangle 92 located in a plane which runs parallel to a plane spanned by the spring ring 90 and is spaced apart from the latter. The rectangle 92 replaces the central region 42 of the spring holder 34 of the first embodiment of the invention. The rectangle 92 engages in the widened section of the transverse groove 56 of the valve closure body 52, it connects the spring holder 82 to the valve closure body 52 via the undercuts 86 of said valve closure body which engage laterally behind said spring holder, and it limits the valve stroke by means of the stroke limiting surfaces 84 of the valve closure body 52 in the manner described regarding the first embodiment of the invention (FIG. 5).

To connect the leaf spring 80 to the spring holder 82, the zigzag shaped leaf spring 80 is shaped at its nearest bend to the spring holder 82 to form a loop 94 whose opening width is smaller than the wire diameter of the spring holder 82. With its loop 94, the leaf spring 80 is fitted onto a narrow side 96 of the rectangle 92 of the spring holder 82. When connecting the leaf spring 80 to the spring holder 82, its loop 94 snaps in on the spring holder 82 owing to the elasticity of the leaf spring 80, and the loop 94 engages around the narrow side 96 of the rectangle 92 of the spring holder 82. A free end 98 of the leaf spring 80, to which the latter continues integrally beyond its loop 94, rests on an opposite narrow side 100 of the rectangle 92 of the spring holder 82.

Owing to the configuration of the spring holder 82 as a bent wire component, waste material is avoided during its manufacture, such as occurs in punched sheet-metal components. Furthermore, this embodiment of the invention has the advantage that the snap-on connection of the leaf spring 80 to the spring holder 82 can easily be checked visually and can thus be inspected more reliably than, for example, a welded or bonded connection and moreover can be produced with less expenditure.

The foregoing relates to preferred exemplary embodiments of the invention, it being understood that other variants and embodiments thereof are possible within the spirit and scope of the invention, the latter being defined by the appended claims.

I claim:

1. A spring-loaded nonreturn valve having a valve closure body which is pressed by a spring element against a valve seat in a valve housing, wherein the valve closure body has a spring holder (34, 82) which is mounted in the valve housing (12) and against which the spring element (44, 80) is supported, and wherein the valve closure body (52) has undercuts (64, 86) which engage behind stop faces (66) of the spring holder (34, 82).

2. The nonreturn valve as claimed in claim 1, wherein the valve closure body (52) has stroke limiting surfaces (62, 84) which strike against counter-surfaces (68) of the spring holder (34, 82) when the nonreturn valve is fully opened.

3. The nonreturn valve as claimed in claim 1, wherein the spring holder (34, 82) has a fastening section 36, 90) which is resilient in the radial direction and is snapped into an inner groove (32, 88) of the valve housing (12).

4. The nonreturn valve as claimed in claim 2, wherein the spring holder (34, 82) has a fastening section 36, 90) which is resilient in the radial direction and is snapped into an inner groove (32, 88) of the valve housing (12).

5. The nonreturn valve as claimed in claim 1, wherein the spring holder (32) is a punched and bent sheet metal component.

6. The nonreturn valve as claimed in claim 2, wherein the spring holder (32) is a punched and bent sheet metal component.

7. The nonreturn valve as claimed in claim 3, wherein the spring holder (32) is a punched and bent sheet metal component.

8. The nonreturn valve as claimed in claim 1, wherein the spring holder (82) is a bent wire component.

9. The nonreturn valve as claimed in claim 2, wherein the spring holder (82) is a bent wire component.

10. The nonreturn valve as claimed in claim 3, wherein the spring holder (82) is a bent wire component.

11. The nonreturn valve as claimed in claim 1, wherein the spring element (44, 80) is a flat shaped spring.

12. The nonreturn valve as claimed in claim 2, wherein the spring element (44, 80) is a flat shaped spring.

13. The nonreturn valve as claimed in claim 3, wherein the spring element (44, 80) is a flat shaped spring.

14. The nonreturn valve as claimed in claim 11, wherein the flat shaped spring (44, 80) is bent in a zigzag or meandering manner.

15. The nonreturn valve as claimed in claim 1, wherein the spring holder (34, 82) is connected to the spring element (44, 80) and forms a module together with the valve closure body (52).

16. The nonreturn valve as claimed in claim 2, wherein the spring holder (34, 82) is connected to the spring element (44, 80) and forms a module together with the valve closure body (52).

17. The nonreturn valve as claimed in claim 11, wherein the flat shaped spring (80) has a loop (94) which engages around a connection section (96) of the spring holder (82), which is arranged radially outside a line of application of spring force, and wherein the flat shaped spring (80) is supported on a point (100) of the spring holder (82) opposite the connection section (96) in relation to the line of application of spring force.

18. The nonreturn valve as claimed in claim 14, wherein the flat shaped spring (80) has a loop (94) which engages around a connection section (96) of the spring holder (82), which is arranged radially outside a line of application of spring force, and wherein the flat shaped spring (80) is supported on a point (100) of the spring holder (82) opposite the connection section (96) in relation to the line of application of spring force.

19. The nonreturn valve as claimed in claim 15, wherein the flat shaped spring (80) has a loop (94) which engages around a connection section (96) of the spring holder (82), which is arranged radially outside a line of application of spring force, and wherein the flat shaped spring (80) is supported on a point (100) of the spring holder (82) opposite the connection section (96) in relation to the line of application of spring force.

20. The nonreturn valve as claimed in claim 11, wherein the flat shaped spring (44, 80) is located in the valve closure body (52) in a transverse groove (56) having the undercuts (64, 86).

21. The nonreturn valve as claimed in claim 14, wherein the flat shaped spring (44, 80) is located in the valve closure body (52) in a transverse groove (56) having the undercuts (64, 86).

22. The nonreturn valve as claimed in claim 1, wherein the valve housing is a delivery piston (12) of a reciprocating pump (10).

23. The nonreturn valve as claimed in claim 11, wherein the flat shaped spring (44, 80) is located in the valve closure body (52) in a transverse groove (56) having the undercuts (64, 86) and the stroke limiting surfaces (62, 84).

\* \* \* \* \*